(12) United States Patent
Yamada et al.

(10) Patent No.: US 7,604,670 B2
(45) Date of Patent: Oct. 20, 2009

(54) ELECTROLYTE-ELECTRODE JOINED ASSEMBLY AND METHOD FOR PRODUCING THE SAME

(75) Inventors: Kazuyuki Yamada, Niiza (JP); Takayuki Yamada, Wako (JP); Naoki Kamide, Itabashi-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 10/982,030

(22) Filed: Nov. 5, 2004

(65) Prior Publication Data

US 2005/0095497 A1    May 5, 2005

(30) Foreign Application Priority Data

Nov. 5, 2003    (JP)    ............................. 2003-375564

(51) Int. Cl.
  H01M 8/12    (2006.01)
  H01M 4/86    (2006.01)
  H01M 4/88    (2006.01)

(52) U.S. Cl. ........................................ 29/623.1; 429/33

(58) Field of Classification Search ........................ None
See application file for complete search history.

(56) References Cited

U.S. PATENT DOCUMENTS

| 5,340,665 | A | * | 8/1994 | Khandkar | ..................... 429/40 |
| 5,342,704 | A | | 8/1994 | Vasilow et al. | |
| 5,397,532 | A | | 3/1995 | Blaimschein | |
| 5,937,264 | A | | 8/1999 | Wallin | |
| 2004/0231143 | A1 | * | 11/2004 | Visco et al. | ................. 29/623.5 |

FOREIGN PATENT DOCUMENTS

| DE | 19626342 A1 | 1/1998 |
| EP | 0588536 A2 | 3/1994 |
| EP | 0588536 A3 | 3/1994 |
| EP | 1096588 A2 | 5/2001 |
| EP | 1096588 A3 | 5/2001 |
| JP | 4-36963 | 2/1992 |
| JP | 5-225986 | 9/1993 |
| JP | 6-163055 | 6/1994 |
| JP | 07-138082 | 5/1995 |
| JP | 8-259346 | 10/1996 |
| JP | 9-69367 | 3/1997 |
| JP | 10-064556 | 3/1998 |
| JP | 11-189481 | 7/1999 |
| JP | 2003-173801 | 6/2003 |
| JP | 2003-173802 | 6/2003 |
| WO | WO 99/56899 A1 | 11/1999 |

OTHER PUBLICATIONS

Japanese Office Action for Application No. 2004-320577, dated May 27, 2008.

* cited by examiner

*Primary Examiner*—John S Maples
(74) *Attorney, Agent, or Firm*—Lahive & Cockfield, LLP; Anthony A. Laurentano (57) ABSTRACT

NiO particles and YSZ particles are mixed with each other at a predetermined ratio. A binder is added, followed by being dispersed in a solvent to prepare granular particles by a spray drying method. The particles are used to obtain a compact by press forming. A YSZ paste is printed on one end surface of the compact, and the compact and the paste are sintered together to prepare an anode and a solid electrolyte. A paste of $La_{0.6}Sr_{0.4}MnO_3$ is printed on one exposed end surface of the solid electrolyte, followed by being heated to calcine a cathode. Thus, an electrolyte-electrode joined assembly is obtained.

5 Claims, 7 Drawing Sheets

ELECTROLYTE-ELECTRODE JOINED ASSEMBLY AND METHOD FOR PRODUCING THE SAME

BACKGROUND OF THE INVENTION

1. Field of the Invention

The present invention relates to an electrolyte-electrode joined assembly which is constructed by interposing a solid electrolyte between an anode and a cathode, and a method for producing the same.

2. Description of the Related Art

A cell, which is provided with an electrolyte-electrode joined assembly comprising a solid electrolyte interposed between an anode and a cathode, is one type of an electrochemical cell such as a fuel cell and an oxygen sensor. In such electrochemical cells, the solid electrolyte is interposed between the anode and the cathode.

In the fuel cell, materials for the anode include, for example, a cermet containing Ni and stabilized zirconia (YSZ) doped with about 8 mole % of $Y_2O_3$ in a weight ratio of 1:1. Materials for the solid electrolyte include, for example, YSZ, and examples of materials for the cathode include a perovskite type oxide such as $LaMnO_3$.

The electrolyte-electrode joined assembly as described above is manufactured as follows. At first, NiO powder and YSZ powder are blended in a weight ratio of 1:1, followed by being pulverized and mixed with a wet ball mill or the like to prepare a paste.

Subsequently, the paste is formed into a film by the doctor blade method or the like. Thus, an anode composed of the mixture of NiO and YSZ is prepared.

Meanwhile, YSZ powder is pulverized with a wet ball mill or the like to prepare a paste. The paste is formed into a film by the doctor blade method or the like in the same manner as described above. Thus, a solid electrolyte composed of YSZ is prepared.

The solid electrolyte manufactured as described above is stacked on one end surface of the anode, and the anode and the solid electrolyte are simultaneously sintered in this state. Accordingly, the anode and the solid electrolyte are joined together.

Subsequently, a paste of $LaMnO_3$ is applied to one end surface of the solid electrolyte to form a film, for example, by the screen printing method. When the paste is heated together with the solid electrolyte and the anode, an electrolyte-electrode joined assembly is obtained, in which the cathode is fired on the solid electrolyte, and the solid electrolyte is interposed between the anode and the cathode.

In a fuel cell provided with the electrolyte-electrode joined assembly as described above, a fuel gas containing hydrogen is supplied to the anode, while an oxygen-containing gas containing oxygen is supplied to the cathode. In particular, the fuel gas is moved toward the solid electrolyte through pores of the anode. The oxygen contained in the oxygen-containing gas combines with the electron in the cathode to produce oxide ion ($O^{2-}$). The hydrogen contained in the fuel gas combines with the oxide ion ($O^{2-}$) having arrived at YSZ contained in the anode from the cathode via the solid electrolyte to produce steam and electrons. The steam is moved to one end surface of the anode through pores of the anode, and the steam is finally discharged from the one end surface.

As described above, the anode is required to be a porous member including pores at a predetermined ratio in order to quickly diffuse the fuel gas supplied to the anode and the steam which is produced. However, the anode provided in accordance with the method as described above, generally has a small porosity. Therefore, the fuel gas and the steam are slowly diffused, and it is difficult to facilitate the cell reaction. In this case, the overvoltage is increased, and the cell voltage is decreased when the current density is increased.

In particular, the steam has a large molecular weight and a large specific gravity as compared with hydrogen. Therefore, the steam tends to remain in the pores. When the remaining amount of the steam is increased, it is difficult for the hydrogen to be diffused. Therefore, it is difficult to facilitate the cell reaction.

Japanese Laid-Open Patent Publication Nos. 10-64556 and 6-163055 suggest increasing the porosity by adding a pore-forming agent to a paste or particles as raw materials for an anode. However, even if the porosity is increased, it is difficult to suppress the accumulation of the steam. Therefore, it is difficult to facilitate the cell reaction to increase the cell voltage.

SUMMARY OF THE INVENTION

A general object of the present invention is to provide an electrolyte-electrode joined assembly which makes it possible to quickly diffuse gas such as steam, which has a large contact area between hydrogen and an anode, and hence which makes it possible to obtain a fuel cell that exhibits a high cell voltage, for example, even when the electric discharge is performed at an increased current density.

A principal object of the present invention is to provide an electrolyte-electrode joined assembly having an electrode including pores which are communicated with each other three-dimensionally to provide a large specific surface area.

Another object of the present invention is to provide a method for producing an electrolyte-electrode joined assembly which makes it possible to obtain an electrode wherein constitutive particles are bonded to one another in an aggregated state, and pores are communicated with each other three-dimensionally.

According to an aspect of the present invention, there is provided an electrolyte-electrode joined assembly comprising a solid electrolyte interposed between an anode and a cathode, wherein at least one of the anode and the cathode is a sintered product composed of constitutive particles bonded to one another in an aggregated state;

pores, which are communicated with each other and of two-dimensional cross sections are not perfect circles, exist between the constitutive particles of the sintered product; and the sintered product has a porosity of 10% to 50% by volume.

An anode or the like, which is formed with a paste, is sintered in a state in which particles are bonded to one another by the aid of a binder. Therefore, when observed by a scanning electron microscope, only spherical pores, which are formed with any pore-forming agent and which are not communicated with each other, are found. Therefore, the opening shapes in a two-dimensional cross section are not prefect circles.

On the contrary, in the case of the electrolyte-electrode joined assembly of the present invention, the granules, in which the particles are aggregated with each other, are roughly or coarsely bonded to one another, and hence the gaps between the granules are communicated with each other three-dimensionally. Therefore, the opening shapes in the two-dimensional cross section are not perfect circles. The specific surface area of the pore as described above is larger than that of the pore included in the anode formed with the paste. Therefore, in the present invention, it is possible to form the pores which are communicated with each other three-dimensionally and which have large specific surface area. Therefore, it is easy for the steam and the fuel gas to successfully diffuse through the pores. Therefore, the steam hardly remains or is accumulated, and it is easy for the fuel gas to enter the pores. The term "specific surface area" means the surface area per unit volume of the pore.

In the present invention, the surface areas of the particles exposed to the pores are large, because the specific surface area of the pore is large. That is, the contact area is increased between the particles and the fuel gas which has entered the pores. Therefore, the reaction is efficiently advanced between the oxide ion conducted through the particles and the hydrogen contained in the fuel gas having entered the pores.

For the reason as described above, the overvoltage is decreased in the anode. Therefore, even when the electric discharge is performed at a large current density, it is possible to obtain a relatively high cell voltage. Therefore, it is possible to obtain a fuel cell which exhibits a high cell voltage, for example, even when the electric discharge is performed while increasing the current density. When the cathode is composed of a porous member in place of the anode, the same effect is obtained.

In this arrangement, it is preferable that depressions exist on the constitutive particles. The depressions serve as passages for the fuel gas or the like. That is, the depressions form parts of the pores. Therefore, it is possible to further increase the specific surface area of the pore. Consequently, it is possible to further decrease the overvoltage.

According to another aspect of the present invention, there is provided a method for producing an electrolyte-electrode joined assembly comprising a solid electrolyte interposed between an anode and a cathode, the method comprising:

manufacturing constitutive particles of one of the anode and the cathode;

manufacturing a compact with the constitutive particles and then heating the compact;

providing the solid electrolyte on one end surface of the compact and then mutually sintering the compact and the solid electrolyte to prepare a sintered product; and providing the other of the anode and the cathode on the solid electrolyte of the sintered product, wherein the one of the anode and the cathode prepared with the compact is manufactured as the sintered product including the constitutive particles bonded to one another in an aggregated state.

According to still another aspect of the present invention, there is provided a method for producing an electrolyte-electrode joined assembly comprising a solid electrolyte interposed between an anode and a cathode, the method comprising:

manufacturing constitutive particles of the anode and the cathode respectively;

manufacturing a compact of the anode and a compact of the cathode with the constitutive particles respectively and then heating the respective compacts;

providing the solid electrolyte on one end surface of any one of the compacts;

placing the other of the compacts on one end surface of the solid electrolyte; and mutually sintering the both compacts and the solid electrolyte to prepare a sintered product, wherein each of the anode and the cathode, which is prepared with each of the compacts, is manufactured as the sintered product including the constitutive particles bonded to one another in an aggregated state.

In any case, the pores, which are formed in the compact, remains to obtain the porous sintered product. Accordingly, it is possible to obtain the electrode in which the constitutive particles are bonded to one another in the state of being aggregated, and the pores are communicated with each other three-dimensionally.

It is preferable that the constitutive particles are manufactured by a spray drying method or a rolling granulation method. In this procedure, it is possible to obtain the aggregated and granular particles. Therefore, it is easy to control the porosity of the compact, and consequently the sintered product. The depressions sometimes exist on the manufactured particles.

Press forming is preferred as a method for manufacturing the compact, for the following reason. That is, when the press forming is adopted, the porosity of the compact can be controlled with ease by adjusting the press pressure.

In order for the porosity of the sintered product finally obtained to be 10% to 50% by volume, it is preferable that a press pressure is 25 to 120 MPa when the press forming is performed.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The electrolyte-electrode joined assembly and the method for producing the same according to the present invention will be explained in detail below with reference to the accompanying drawings as exemplified by preferred embodiments. In the following description, all numerical values of the porosity indicates values obtained after reducing nickel oxide.

Figure 1:
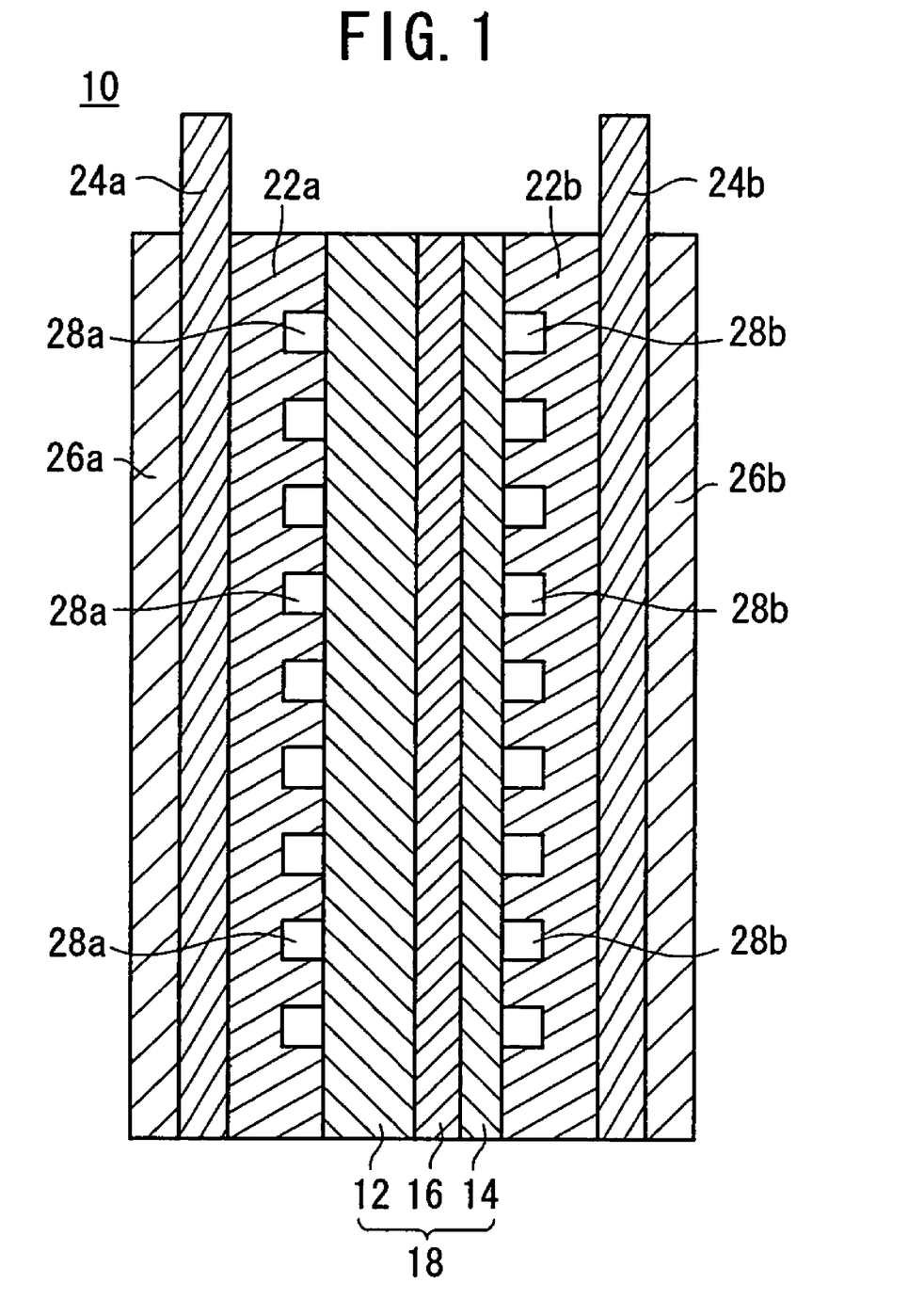
FIG. 1 is a schematic vertical sectional view illustrating a power-generating cell of a fuel cell having an electrolyte-electrode joined assembly according to an embodiment of the present invention.

FIG. 1 shows a schematic vertical sectional view illustrating a power-generating cell of a fuel cell having an electrolyte-electrode joined assembly according to an embodiment of the present invention. The power-generating cell 10 comprises an electrolyte-electrode joined assembly 18 including a solid electrolyte 16 interposed between an anode 12 and a cathode 14, in which the anode 12, the solid electrolyte 16, and the cathode 14 are joined together. The thickness of the anode 12, the solid electrolyte 16, and the cathode 14 is about 1 mm, about 5 μm, and about 30 μm respectively.

In this arrangement, the anode 12 is composed of a cermet (sintered product) in which Ni and YSZ are contained at a weight ratio of 1:1, and the porosity is 10% to 50% by volume. If the porosity is less than 10% by volume, it is difficult for the fuel gas to diffuse efficiently. If the porosity exceeds 50% by volume, the strength is decreased. More preferably, the porosity is 20% to 45% by volume.

Figure 2:
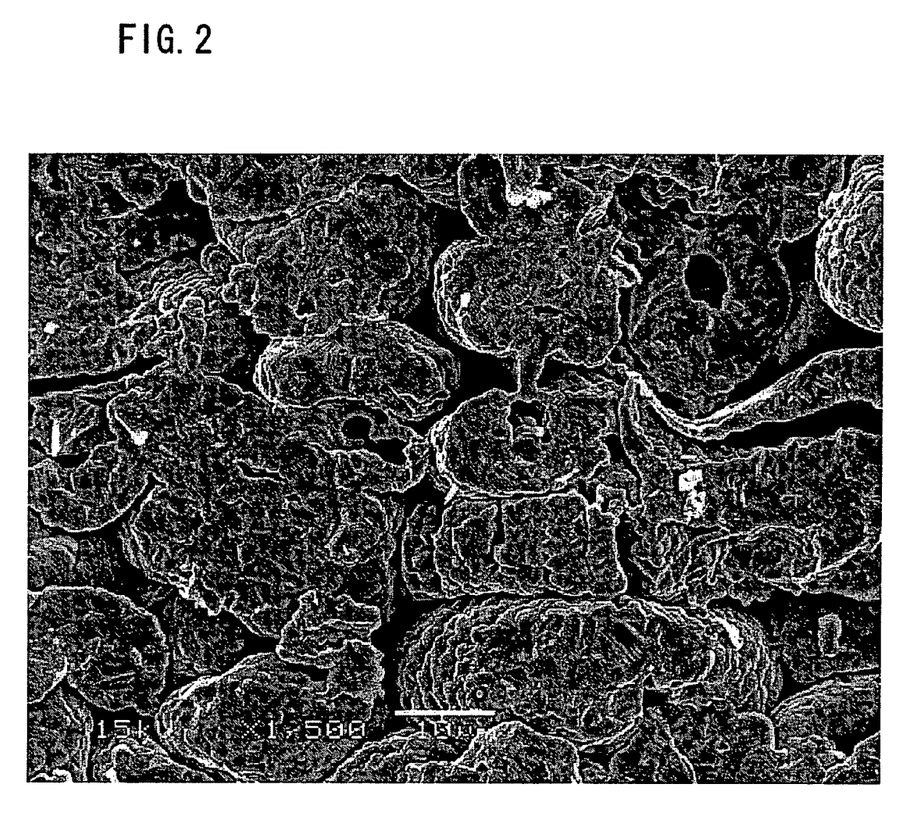
FIG. 2 is an SEM photograph illustrating an anode before reduction for constructing the electrolyte-electrode joined assembly shown in FIG. 1.
Figure 3:
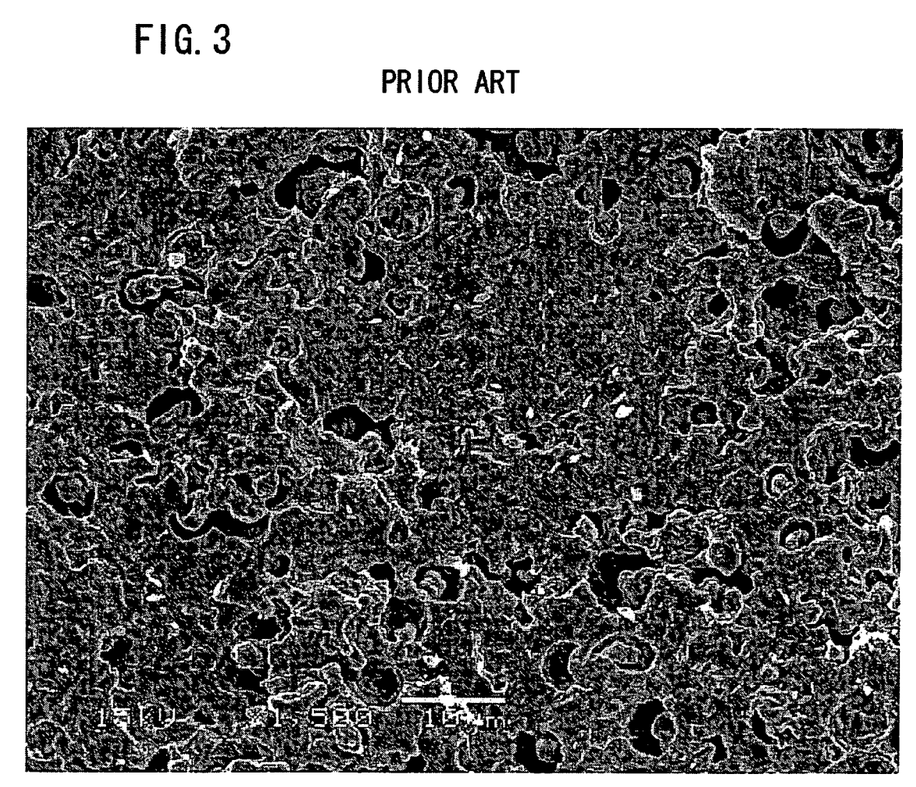
FIG. 3 is an SEM photograph illustrating an anode before reduction, as manufactured in accordance with the conventional technique.

FIG. 2 shows a scanning electron microscope (SEM) photograph illustrating the anode 12, and FIG. 3 shows an SEM photograph illustrating an anode manufactured with a paste in accordance with the conventional technique. As shown in FIG. 3, no distinct grain boundary exists in the conventional technique, because the particles are continuously bonded to one another. On the contrary, as shown in FIG. 2, the anode 12 for constructing the electrolyte-electrode joined assembly 18 according to the embodiment of the present invention, the particles of the raw material are bonded to one another in an aggregated state. That is, the presence of the grain boundary is visually recognizable with ease.

Pores, which exist in the conventional technique, are only pores having elliptic opening shapes in a two-dimensional cross section, i.e., elliptic spherical pores. In this case, even when the hydrogen is introduced into the pores, the area, in which the particles for constructing the anode make contact with the hydrogen, is small. Further, the gap between the pores is extremely small, and hence the steam and the hydrogen are slowly diffused.

On the other hand, in the embodiment of the present invention, depressions and cavities exist in the particles themselves constructing the anode 12. Therefore, the anode 12 is formed with a large number of the pores which are connected or communicated with each other three-dimensionally such that a network of the pores is formed therein and of which two-dimensional cross sections are not perfect circles, by continuing the depressions, the cavities, and the gaps between the particles. That is, the volume of one pore is increased, and hence the contact area between the constitutive particles and the hydrogen is increased. Thus, the steam and the hydrogen are diffused in the pores extremely quickly.

As described above, according to the embodiment of the present invention, the anode is constructed by the porous member including the pores which are communicated with each other three-dimensionally and of which the two-dimensional cross sections are not perfect circles. Accordingly, the contact area between the constitutive particles and the hydrogen is increased in the anode, and the steam and the hydrogen are diffused quickly.

In the embodiment of the present invention, the solid electrolyte 16 is composed of YSZ, and the cathode 14 is composed of $La_{0.6}Sr_{0.4}MnO_3$ as a perovskite type oxide.

The electrolyte-electrode joined assembly 18, which is constructed as described above, is interposed between a pair of separators 22a, 22b (see FIG. 1). Collecting electrodes 24a, 24b are arranged outside the separators 22a, 22b respectively. Further, end plates 26a, 26b are arranged outside the collecting electrodes 24a, 24b respectively. The end plates 26a, 26b are connected to one another by unillustrated bolts, and the electrolyte-electrode joined assembly 18, the separators 22a, 22b, and the collecting electrodes 24a, 24b are interposed between the end plates 26a, 26b. Thus, the power-generating cell 10 is constructed. Gas flow passages 28a, 28b are formed for the separators 22a, 22b respectively in order to supply the fuel gas or the oxygen-containing gas to the anode 12 or the cathode 14.

The electrolyte-electrode joined assembly 18 according to the embodiment of the present invention is basically constructed as described above. Next, its function and effect will be explained.

When the power-generating cell 10 constructed as described above is operated, the temperature of the power-generating cell 10 is raised to about 500° to 1,000° C. After that, the oxygen-containing gas containing the oxygen is allowed to flow through the gas flow passage 28b provided for the separator 22b. On the other hand, the fuel gas containing the hydrogen is allowed to flow through the gas flow passage 28a provided for the separator 22a.

The oxygen contained in the oxygen-containing gas is combined with the electron in the cathode 14 composed of $La_{0.6}Sr_{0.4}MnO_3$ to produce the oxide ion ($O^{2-}$). The produced oxide ion is conducted through the solid electrolyte 16 beginning at the cathode 14, and the oxide ion is moved to the interface of the solid electrolyte 16 opposed to the anode 12. Further, the oxide ion is conducted through the anode 12 by the aid of the YSZ particles as the constitutive particles of the anode 12 (cermet).

On the other hand, the fuel gas, which is supplied to the anode 12, is quickly diffused in the anode 12 by the aid of the pores which are communicated with each other three-dimensionally. The hydrogen, which is contained in the fuel gas and which has entered the pores as described above, reacts with the oxide ion which are conducted through the YSZ particles as the constitutive particles of the anode. As a result, the steam and the electron are released.

As described above, in the embodiment of the present invention, the pores, which exist in the anode 12, are communicated with each other three-dimensionally. Therefore, the fuel gas (hydrogen) is quickly diffused. Further, the individual pores have large specific surface areas. Therefore, the YSZ particles, which are exposed to the pores, have large surface areas. Accordingly, the contact area between the hydrogen and the constitutive particles of the anode 12 is increased. Therefore, the reaction between the hydrogen and the oxide ion is advanced efficiently, and thus the overvoltage is decreased.

The released electron is taken out by an external circuit which is electrically connected to the collecting electrodes 24a, 24b. The electron is utilized as DC electric energy to energize the external circuit. After that, the electron arrives at the cathode 14 to combine with the bonding to the oxygen supplied to the cathode 14.

The steam is quickly diffused to the separator 22a via the pores, which are communicated with each other three-dimensionally, of the anode 12, and the steam is discharged outside of the system from the gas flow passage 28a of the separator 22a. That is, in the embodiment of the present invention, the steam is quickly discharged from the anode 12 without remaining in the pores. Accordingly, it is easy for the hydrogen to diffuse in the anode 12. Therefore, the overvoltage is further decreased.

Figure 4:
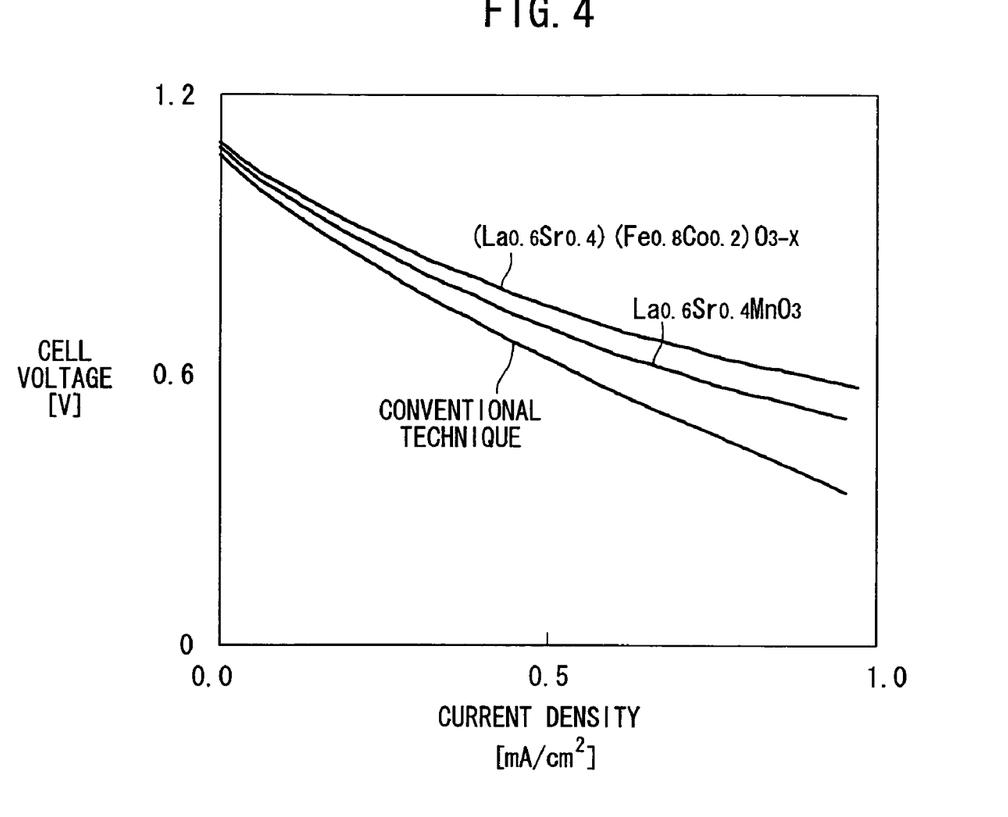
FIG. 4 is a graph illustrating the relationship between the current density and the cell voltage in power-generating cells.

FIG. 4 shows the relationship between the current density and the cell voltage during the electric discharge in the power-generating cell provided with the anode manufactured in accordance with the conventional technique and the power-generating cell 10 according to the embodiment of the present invention. According to FIG. 4, it is clear that the high cell voltage is obtained with the power-generating cell 10, because the overvoltage is small even when the electric discharge is performed at large current densities.

Figure 5:
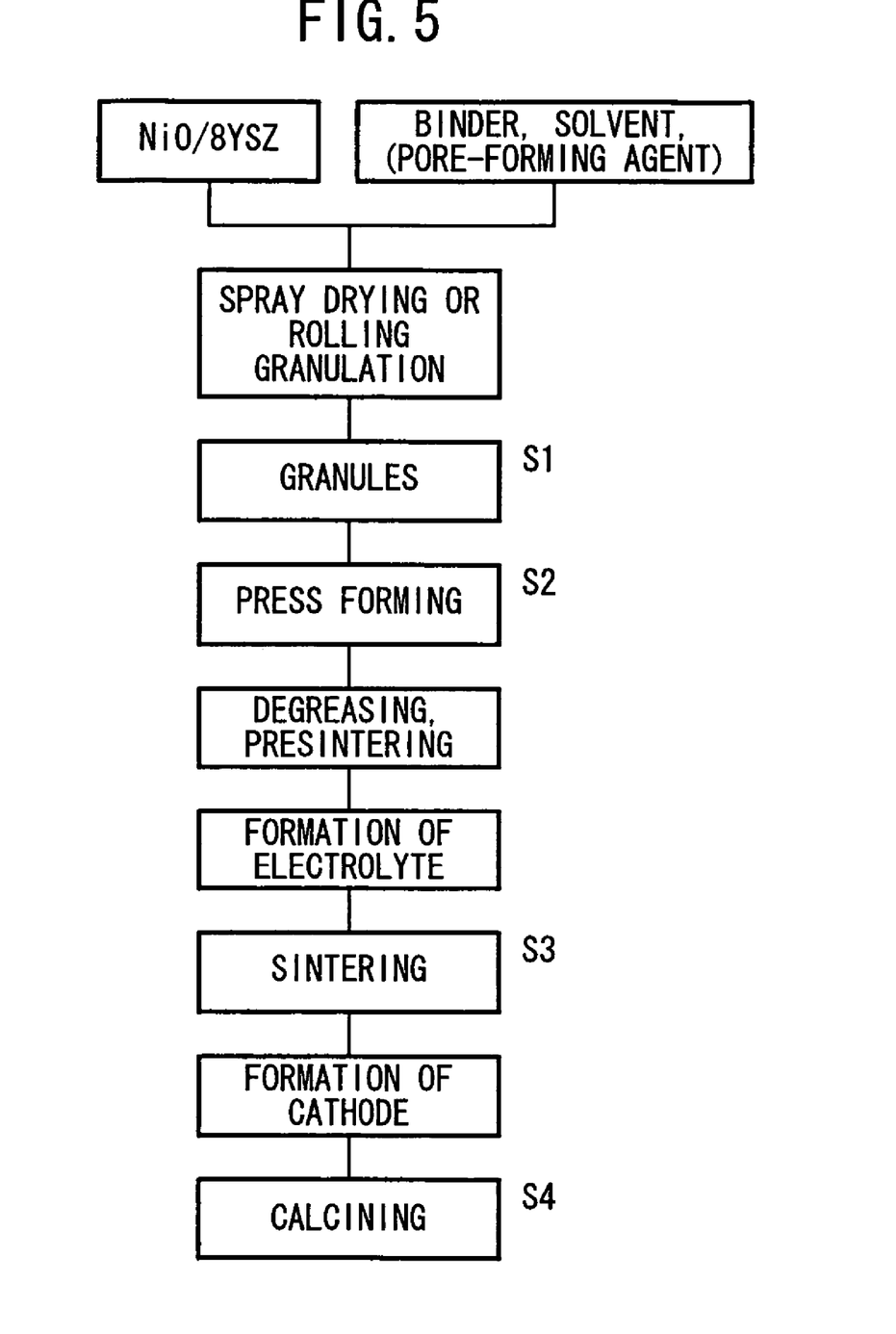
FIG. 5 is a flow chart illustrating a method for producing the electrolyte-electrode joined assembly according to an embodiment of the present invention.

The electrolyte-electrode joined assembly 18 according to the embodiment of the present invention is manufactured, for example, as follows in accordance with a flow chart shown in FIG. 5. The production method comprises a first step S1 of manufacturing the constitutive particles of the anode 12, a second step S2 of manufacturing a compact with the constitutive particles and heating the compact, a third step S3 of providing the solid electrolyte on one end surface of the compact and mutually sintering the compact and the solid electrolyte to prepare a sintered product, and a fourth step S4 of providing the cathode 14 on the solid electrolyte of the sintered product.

At first, in the first step S1, NiO particles and YSZ particles are mixed with each other at a weight ratio of 1:1. A binder, which is based on polyvinyl alcohol or which is based on acrylic, is further added to the mixed particles in an amount of about 3% by weight, followed by being dispersed in a solvent. If necessary, a pore-forming agent such as resin and carbon may also be added.

Figure 6:
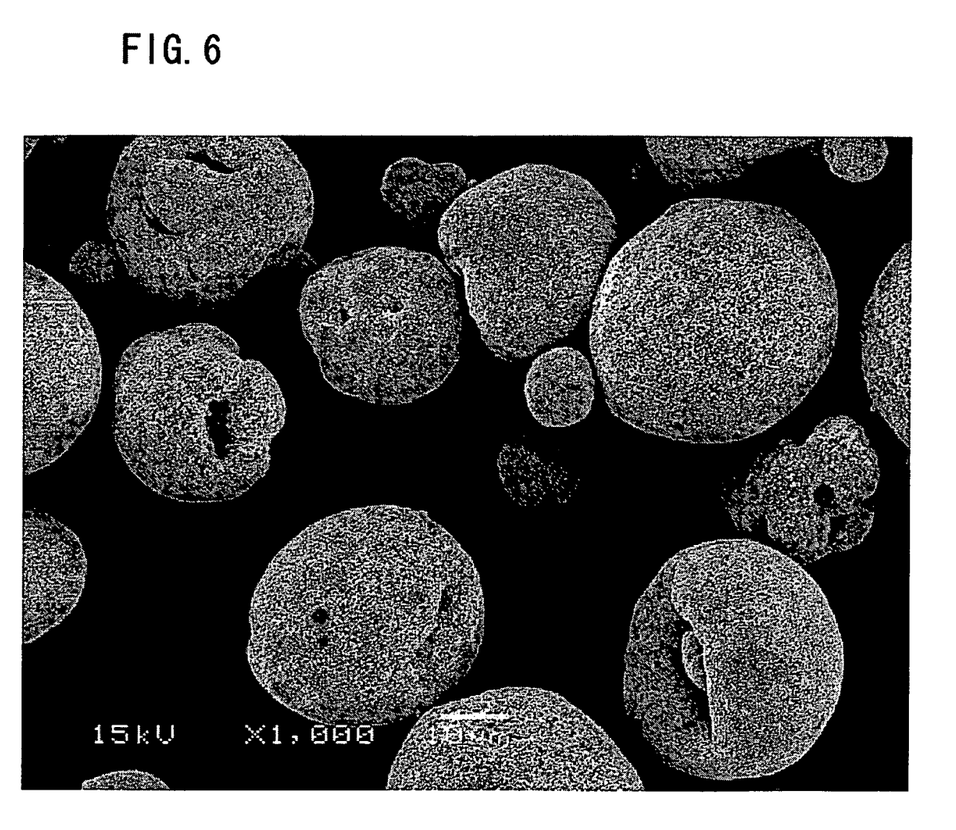
FIG. 6 is an SEM photograph illustrating granular particles as a raw material for the anode shown in FIG. 2.

Subsequently, the mixed particles dispersed in the solvent are dried with a spray drying (spray dryer) method. That is, the solvent is evaporated and removed by making contact with the high temperature-air flow, and thus the granular mixed particles are obtained. FIG. 6 shows an SEM photograph illustrating the obtained mixed particles. According to FIG. 6, the mixed particles having depressions are present. Usually, the particles having such shapes are not used as the raw material for any compact or any sintered product. However, in the embodiment of the present invention, even such particles may be used as the raw material for the compact having pores, because the pores are also provided by the depressions.

Figure 7A:
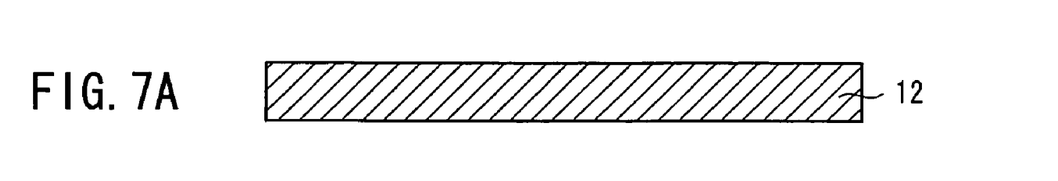
FIGS. 7A through 7C are schematic longitudinal sectional views illustrating states in which a solid electrolyte and a cathode are successively provided on an anode.

Subsequently, in the second step S2, the granular mixed particles are press formed to obtain an anode 12 having a predetermined shape as shown in FIG. 7A.

In this step, the press pressure is set so that the porosity of the compact is about 40% to 70% by volume so that the porosity of the sintered product to be finally obtained is 10% to 50% by volume. Specifically, the press pressure is preferably 25 to 120 MPa and mote preferably 40 to 100 MPa.

When the press forming is performed at the press pressure as described above, the gaps between the particles are prevented from being excessively crushed under the pressure. Therefore, the pores, which are communicated with each other three-dimensionally, are formed between the particles. When the depressions are present on the particles, the depressions also serve as flow passages for the fuel gas. That is, the depressions form parts of the pores. The two-dimensional cross section of the pores formed as described above is not a perfect circle (see FIG. 2).

The compact manufactured as described above, i.e., the anode 12 is debinded (the binder in the anode 12 is removed), followed by being presintered by heating and retaining the anode 12 at about 1,100° C.

Figure 7B:
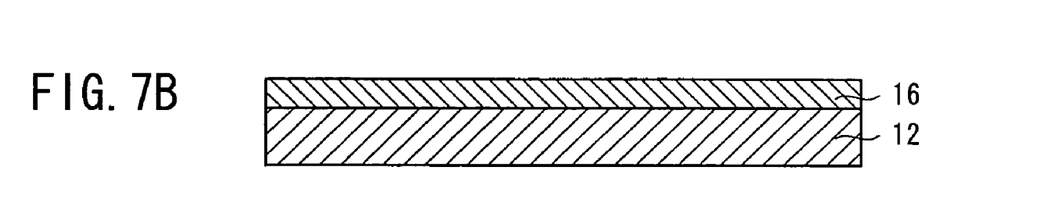

Subsequently, in the third step S3, a previously prepared paste of YSZ is printed on one end surface of the anode 12, for example, by the screen printing method. After that, the anode 12, on which the paste is printed, is heated and retained at about 1,500° C. Accordingly, the anode 12 is sintered, simultaneously with the paste is sintered to obtain a solid electrolyte 16 as shown in FIG. 7B.

Figure 7C:
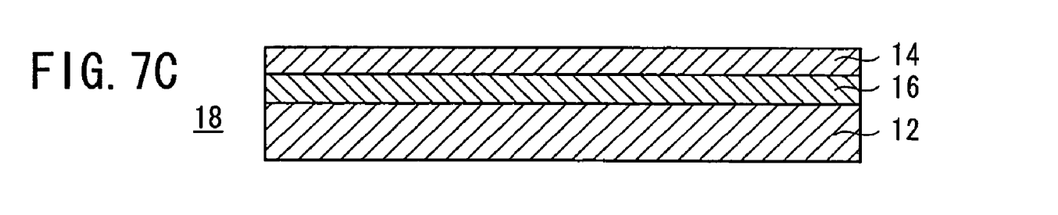

Subsequently, in the fourth step S4, a paste of $La_{0.6}Sr_{0.4}MnO_3$ is applied to an exposed one end surface of the solid electrolyte 16, for example, the screen printing method. After that, the paste is heated in an reduced atmosphere together with the anode 12 and the solid electrolyte 16 to fire and calcine the cathode 14 on the solid electrolyte 16 as shown in FIG. 7C. Accordingly, the electrolyte-electrode joined assembly 18 is obtained, in which the solid electrolyte 16 is interposed between the anode 12 and the cathode 14.

The anode 12 is slightly shrunk in accordance with the grain growth caused by the sintering and the reduction of NiO caused by the hydrogen contained in the fuel gas supplied during the operation of the fuel cell. Accordingly, the porosity of the anode 12 is 10% to 50% by volume (after the reduction to Ni).

In the anode 12 provided as described above, the constitutive particles are bonded to one another in an aggregated state (see FIG. 2). That is, when the SEM observation is performed, the presence of the grain boundary is visually recognizable with ease.

In order to construct the power-generating cell 10 (see FIG. 1), the separators 22a, 22b, the collecting electrodes 24a, 24b, and the end plates 26a, 26b are further arranged at respective end surfaces of the anode 12 and the cathode 14 of the electrolyte-electrode joined assembly 18. The cathode 14 may also be composed of $La_{0.6}Sr_{0.4}Fe_{0.8}Co_{0.2}O_{3-x}$ (LSCF).

In the embodiment described above, the granular particles are formed, followed by being sintered to provide the anode 12. However, a cathode may be provided with granular particles in the same manner.

Alternatively, both the anode and the cathode may be prepared as compacts with granular particles. The paste of YSZ is applied to any one of the compacts, and then the remaining compact is placed on the paste. Both compacts and the paste are sintered, and the solid electrolyte is interposed between the anode and the cathode.

Materials for the anode, the cathode, and the solid electrolyte are not specifically limited to Ni/YSZ, the perovskite type oxide, and YSZ. For example, the cathode may be constructed with fluorite type oxide.

Further, when the anode or the cathode is manufactured, any technique other than the spray drying method is usable provided that granular particles can be prepared. For example, the rolling granulation method may be used.

Although certain preferred embodiments of the present invention have been shown and described in detail, it should be understood that various changes and modifications may be made therein without departing from the scope of the appended claims.

What is claimed is

1. A method for producing an electrolyte-electrode joined assembly comprising a solid electrolyte interposed between an anode and a cathode, said method comprising:

manufacturing constitutive particles of one said anode and said cathode by a spray drying method or a rolling granulation method:

manufacturing a compact with said constitutive particles by press forming at a press pressure of 25 to 120 MPa such that a porosity of the compact becomes 40% to 70%, and then heating said compact;

providing said solid electrolyte on one end surface of said compact and then mutually sintering said compact and said solid electrolyte to prepare a sintered product; and providing other of said anode and said cathode on said solid electrolyte of said sintered product, wherein said one of said anode and said cathode prepared with said compact is manufactured as a portion of said sintered product and includes said constitutive particles bonded to one another in an aggregated state and pores which communicates with each other three-dimensionally and of which two-dimensional cross sections are not perfect circles, such that a porosity of the sintered product is 10% to 50% by volume.

2. The method for producing said electrolyte-electrode joined assembly according to claim 1, wherein a pore-forming agent is added to said constitutive particles to manufacture said compact.

3. The method for producing said electrolyte-electrode joined assembly according to claim 1, wherein depressions exist on the constitutive particles.

4. The method for producing said electrolyte-electrode joined assembly according to claim 1, wherein the porosity of the sintered product is 20% to 40% by volume.

5. The method for producing said electrolyte-electrode joined assembly according to claim 1, wherein a portion of said sintered product is said anode.

* * * * *